US008663016B2

(12) United States Patent  (10) Patent No.: US 8,663,016 B2
Yamamoto  (45) Date of Patent: Mar. 4, 2014

(54) GAME SYSTEM, COMPUTER PROGRAM FOR SAME, AND METHOD OF CONTROLLING THE GAME SYSTEM

(75) Inventor: Takao Yamamoto, Tokyo (JP)

(73) Assignee: Konami Digital Entertainment Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/583,903

(22) PCT Filed: Mar. 11, 2011

(86) PCT No.: PCT/JP2011/055825
§ 371 (c)(1),
(2), (4) Date: Sep. 10, 2012

(87) PCT Pub. No.: WO2011/115016
PCT Pub. Date: Sep. 22, 2011

(65) Prior Publication Data
US 2013/0012321 A1 Jan. 10, 2013

(30) Foreign Application Priority Data

Mar. 15, 2010 (JP) ................................. 2010-057506

(51) Int. Cl.
*G07F 17/32* (2006.01)
(52) U.S. Cl.
USPC ............................................. 463/42; 463/31
(58) Field of Classification Search
USPC .......................................... 463/7, 35–37, 42
See application file for complete search history.

(56) References Cited

U.S. PATENT DOCUMENTS

| 6,379,244 | B1 | 4/2002 | Sagawa et al. |
| 6,461,239 | B1 | 10/2002 | Sagawa et al. |
| 6,645,067 | B1 * | 11/2003 | Okita et al. ........................ 463/7 |
| 2004/0110561 | A1 | 6/2004 | Kawamura |
| 2009/0137296 | A1 | 5/2009 | Takahashi et al. |
| 2011/0105227 | A1 | 5/2011 | Matsumoto et al. |

FOREIGN PATENT DOCUMENTS

| JP | 2922509 B2 | 7/1999 |
| JP | 2000-155543 A | 6/2000 |
| JP | 2004-195210 A | 7/2004 |
| JP | 2006-325885 A | 12/2006 |

(Continued)

OTHER PUBLICATIONS

Chinese Office Action with English Translation (Date Issued May 22, 2013).

(Continued)

*Primary Examiner* — Omkar Deodhar
(74) *Attorney, Agent, or Firm* — Howard & Howard Attorneys PLLC

(57) ABSTRACT

A game system (1) is provided with a monitor (3), a touch panel (4) and a sequence data storage device which stores sequence data in which operation time of the touch panel (4) during a game and appearance time when an object (O) for indicating an operation at the operation time is displayed on a game area (A). The game system (1) accepts a determination operation of an appearance position which determines the appearance position (p) of the object (O) in correspondence to the appearance time from the touch panel (4) generates the object (O) at the appearance position (p), changes the way (W) until the object (O) arrives in a determination line (Li) based on the appearance position (p) and changes an arrival position where the object (O) arrives in the determination line (Li).

13 Claims, 8 Drawing Sheets

(56) References Cited

FOREIGN PATENT DOCUMENTS

| | | |
|---|---|---|
| JP | 2008-200295 A | 9/2008 |
| JP | 4309461 B1 | 8/2009 |
| WO | 2009/123165 A1 | 10/2009 |

OTHER PUBLICATIONS

International Search Report (date of mailing May 17, 2011).
Korean Office Action with English Translation—Issued Oct. 10, 2013.

* cited by examiner

GAME SYSTEM, COMPUTER PROGRAM FOR SAME, AND METHOD OF CONTROLLING THE GAME SYSTEM

CROSS REFERENCE TO RELATED APPLICATION

This application is a national stage application of PCT/JP2011/055825, filed Mar. 11, 2011, which claims priority to Japanese Patent Application No. 2010-057506, filed Mar. 15, 2010, the disclosures of which are hereby incorporated by reference in their entirety.

TECHNICAL FIELD

The present invention relates to a game system which indicates an operation time of an operating device accepting a player's operation to the player, a computer program for the same and a method of controlling the game system.

BACKGROUND ART

There is a game machine which operates an operating portion in rhythm to music (see, for example, Patent Literature 1). In this game machine, a play is evaluated based on the operation timing by operating the operating device in rhythm to music when an operation indicator indicating the operation time moves to a predetermined operation position.
Patent Literature 1: JP-A-2000-155543.

SUMMARY OF INVENTION

Technical Problem

This music game requires a player's operation according to a predetermined operation timing. Since there are no game elements other than the operation according to the operation timing, the game easily becomes monotonous.

Therefore, the present invention aims to provide a game system, which adds a new game element to an operation associated with a predetermined operation timing, a computer program for the same, and a method of controlling the game system.

Solution to Problem

The game system of the present invention is a game system comprising: a display device which displays a game screen; an operating device which accepts an operation of a player; a sequence data storage device which stores sequence data in which operation time of the operating device during a game and appearance time when an operation indicator for indicating an operation at the operation time is displayed on a game area are described in correspondence to each other; an appearance position control device which accepts a determination operation of an appearance position which determines the appearance position of the operation indicator in correspondence to the appearance time from the operating device in an appearance area which occupies a part of the game area displayed on the display device and controls so as to generate the operation indicator at the appearance position; and a way control device which controls so as to change a way until the operation indicator arrives in an operation reference portion at the operation time based on the appearance position determined by the appearance position control device; wherein the way control device changes an arrival position where the operation indicator arrives in the operation reference portion in accordance with the change of the way.

According to the game system of the present invention, the determination operation of the appearance position by the player is accepted, and the operation indicator appears in the appearance area. The way of the operation indicator is changed by a difference of the appearance position, and the operation indicator arrives in the operation reference portion at a predetermined operation time. In this way, in addition to the operation at the operation timing when the operation indicator arrives in the operation reference portion, an operation of making the operation indicator appear is performed by a player, and the position where the operation indicator arrives at the operation reference portion is changed in accordance with the appearance position. Therefore, it is possible to add a new game element in which a player predicts the position where the operation indicator arrives in the operation reference portion and selects the appearance position of the operation indicator. Therefore, in addition to the operation at the operation timing when the operation indicator arrives in the operation reference portion, an operation of making the operation indicator appear is enabled. As such, a player can obtain a new play sense in which the operation indicator is made to appear on the game area and the position at which the operation indicator arrives in the operation reference portion is changed in accordance with the appearance position. Therefore, it is possible to enhance the enjoyability of game.

As one aspect of the game system of the present invention, the appearance position control device generates the operation indicator when the determination operation of the appearance position is performed in a regulation time when the determination operation of the appearance position can be accepted in correspondence to the appearance time. According to this, when the player does not perform the determination operation of the appearance position in the regulation time, the operation indicator does not appear in the appearance area. When the operation indicator is not generated, a subsequent operation in the operation reference portion cannot be performed. Hence, the game element can be further enhanced.

As one aspect of the game system of the present invention, the appearance position control device controls such that the appearance area is movable in the game area based on a predetermined rule. According to this, a difficulty level can be set to the operation of making the operation indicator appear. Therefore, it is possible to enhance the enjoyability of game.

As one aspect of the game system of the present invention, the game area includes in an indicator guide portion which guides the movement of the operation indicator and the way control device controls so as to change the way of the operation indicator which appears at the appearance position in accordance with a characteristic of the indicator guide portion. According to this, the operation indicator appearing in the appearance area moves along the indicator guide portion and arrives at the operation reference portion. In addition to the appearance position, the way of the operation indicator is changed by a characteristic of the indicator guide portion. Therefore, it is possible to enhance the enjoyability of game.

In the aspect that the indicator guide portion is provided in the game area, comprising an indicator guide portion data storage device which stores a plurality of indicator guide portion data in which the characteristic of the indicator guide portion is described, wherein the way control device changes the way of the operation indicator based on the indicator guide portion data selected from the indicator guide portion data storage device. According to this, by providing a plurality of indicator guide portion, the way of the operation indicator is diversified. Therefore, it is possible to enhance the enjoyability of game and the game can attract the player. In this aspect, information for specifying a path of the guided operation indicator is set as the characteristic of the indicator guide portion. Further, information for specifying a velocity of the guided operation indicator is set as the characteristic of the indicator guide portion.

As one aspect of the game system of the present invention, comprising a position evaluation device which makes an evaluation based on an arrival position where the operation indicator arrives in the operation reference portion. According to this, the evaluation is made by the arrival position determined according to the appearance position at which the player makes the operation indicator appear. For example, by setting a specific region to a higher evaluation, the player aims at the specific region. Therefore, it is possible to enhance the enjoyability of game.

In the aspect of evaluating the arrival position of the operation indicator, comprising an operation reference portion data storage device which stores operation reference portion data in which different evaluations of each region where the operation reference portion is divided are described, wherein the position evaluation device evaluates a region including the arrival position based on the operation reference portion data as the evaluation of the operation of the player. According to this, the evaluation is changed based on the arrival position of the operation indicator. Therefore, it is possible to enhance the enjoyability of game. If a plurality of operation reference portion data is provided, a game condition can be diversified. Therefore, a range of a play can be widened, and the game can attract the player.

In the aspect of evaluating the arrival position of the operation indicator, a moving path where the operation reference portion moves in the game area is set in the operation reference portion data. Since a difficulty level of the game can be adjusted, the game can be diversified.

As one aspect of the game system of the present invention, comprising an operation evaluation device which accepts the operation from the operating device at the operation timing when the operation indicator appearing at the appearance position moves and arrives in the operation reference portion at the operation time and evaluates a difference between the operation time and the operation from the operating device. According to this, in addition to the evaluation based on the arrival position, the evaluation based on the operation timing of the player is made. Therefore, since evaluation items are increased, the adjustment of the difficulty level of the game can be set in minute details. The game configuration can be diversified, and the game can attract the player.

The computer program of the present invention is a computer program for a game system comprising: a display device which displays a game screen; an operating device which accepts an operation of a player; and a sequence data storage device which stores sequence data in which operation time of the operating device during a game and appearance time when an operation indicator for indicating an operation at the operation time is displayed on a game area are described in correspondence to each other; wherein the computer program causes the game system to serve as: an appearance position control device which accepts a determination operation of an appearance position which determines the appearance position of the operation indicator in correspondence to the appearance time from the operating device in an appearance area which occupies a part of the game area displayed on the display device and controls so as to generate the operation indicator at the appearance position; and a way control device which controls so as to change a way until the operation indicator arrives in an operation reference portion at the operation time based on the appearance position determined by the appearance position control device; wherein the way control device changes an arrival position where the operation indicator arrives in the operation reference portion in accordance with the change of the way.

It is possible to serve as a game system of the present invention by executing the program of the present invention on the computer of the game system.

The method of controlling the game system of the present invention is a method of controlling a game system comprising: a display device which displays a game screen; an operating device which accepts an operation of a player; and a sequence data storage device which stores sequence data in which operation time of the operating device during a game and appearance time when an operation indicator for indicating an operation at the operation time is displayed on a game area are described in correspondence to each other; wherein the method causes the game system to execute: an appearance position control step which accepts a determination operation of an appearance position which determines the appearance position of the operation indicator in correspondence to the appearance time from the operating device in an appearance area which occupies a part of the game area displayed on the display device and controls so as to generate the operation indicator at the appearance position; and a way control step which controls so as to change a way until the operation indicator arrives in an operation reference portion at the operation time based on the appearance position determined by the appearance position control device; wherein the way control step changes an arrival position where the operation indicator arrives in the operation reference portion in accordance with the change of the way.

It is possible to serve as a game system of the present invention by executing the method of the present invention on the computer of the game system.

Advantageous Effects of Invention

As described above, according to the present invention, the determination operation of the appearance position by the player is accepted, and the operation indicator appears in the appearance area. The way of the operation indicator is changed by a difference of the appearance position, and the operation indicator arrives in the operation reference portion at a predetermined operation time. In this way, in addition to the operation at the operation timing when the operation indicator arrives in the operation reference portion, an operation of making the operation indicator appear is performed by a player, and the position where the operation indicator arrives at the operation reference portion is changed in accordance with the appearance position. Therefore, it is possible to add a new game element in which a player predicts the position where the operation indicator arrives in the operation reference portion and selects the appearance position of the operation indicator. Therefore, in addition to the operation at the operation timing when the operation indicator arrives in the operation reference portion, an operation of making the operation indicator appear is enabled. As such, a player can obtain a new play sense and it is possible to enhance the enjoyability of game.

DESCRIPTION OF EMBODIMENTS

Figure 1:
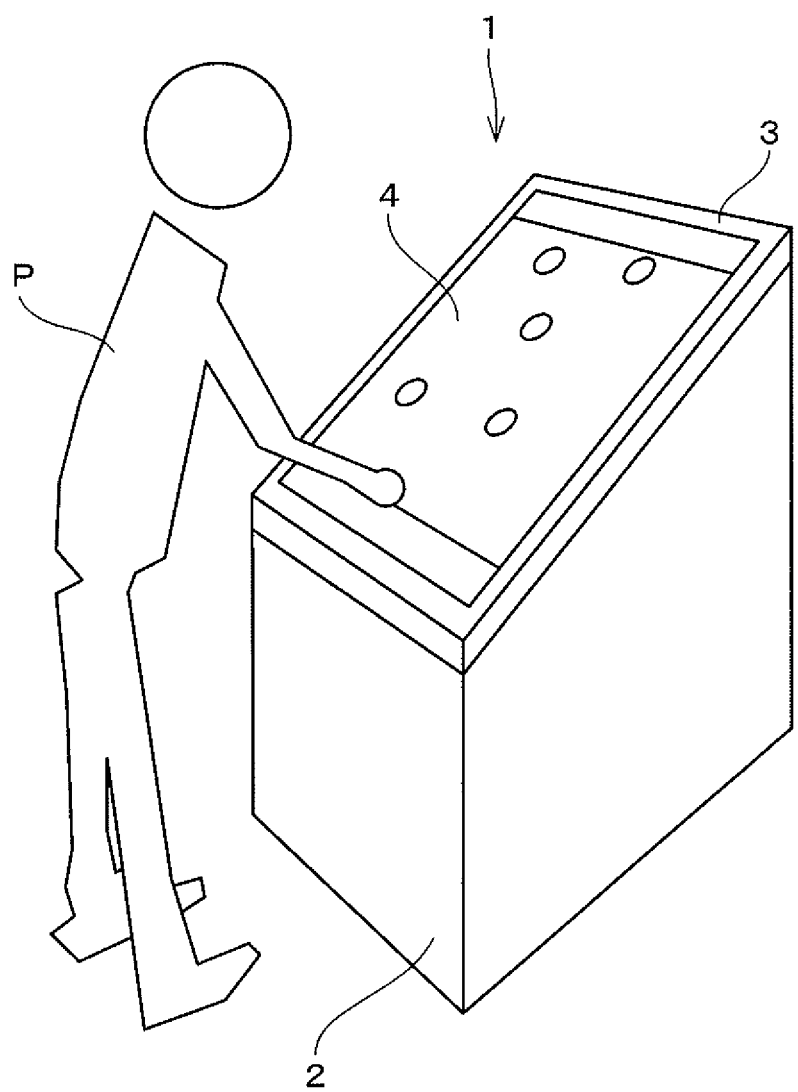
FIG. 1 is a diagrammatic illustration of a game machine to which a game system is applied according to one aspect of the present invention.

FIG. 1 is a diagrammatic illustration of a game machine to which a game system is applied according to one aspect of the present invention. The game machine 1 is a business use game machine installed in a commercial facility, and is configured as a music game machine which evaluates operation timings by one or more players P in accordance with the music. The game machine 1 is provided with a chassis 2 and a monitor 3 disposed on a top surface of the chassis 2 inclined toward the player P. On the surface of the monitor 3, a transparent touch panel 4 is overlapped. The touch panel 4 is conventional input device which outputs signals according to touch positions where the player P touches the touch panel 4 with his or her finger or the like. Further, the monitor 3 serves as a display device and the touch panel 4 serves as an operation device. In addition, the game machine 1 is provided with various input devices and output devices to be equipped in the business use game machine, such as buttons to make a choice or a determination, a power switch, a power lamp, or the like, but illustration thereof is omitted in FIG. 1. The game machine 1 executes a music game which displays a game area A, on which an object O as an operation indicator and a determination line Li as an operation reference portion appear, on the monitor 3, allows the player P to perform an operation of the touch panel 4 at a timing at which the object O is matched with the determination line Li according to a reproduction of a music (a music piece) selected by the player P, and evaluates the operation of the player P according to the operation timing (see FIG. 3). Details will be described later.

Figure 2:
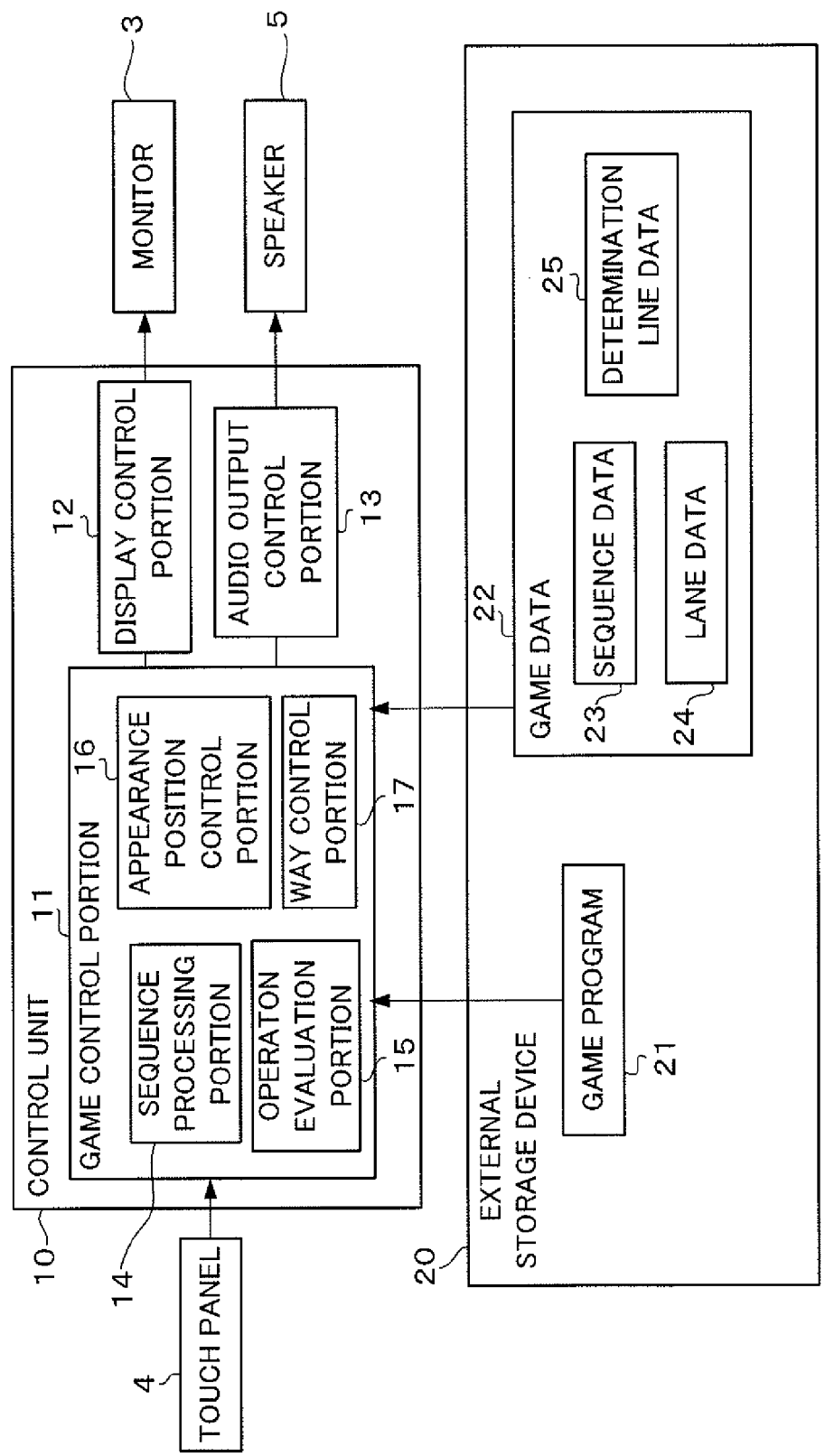
FIG. 2 is a functional block diagram of the game machine.

A functional block diagram of the game machine 1 is illustrated in FIG. 2. The game machine 1 is provided with a control unit 10 as a computer. The control unit 10 is provided with a game control portion 11, and a display control portion 12 and an audio output control portion 13 operating according to an output of the game control portion 11. The game control portion 11 is configured as a unit in which a microprocessor and various peripheral devices, such as an internal storage device (for example, a ROM and a RAM) necessary for the operation of the microprocessor, are combined. To the game control portion 11, there is connected the touch panel 4 to accept operation by the player. The display control portion 12 displays a predetermined image on the monitor 3 by drawing an image on a frame buffer according to image data provided by the game control portion 11, and issuing a image signal corresponding to the image to the monitor 3. The audio output control portion 13 makes a speaker 5 reproduce predetermined sounds (including a music sound and the like) by generating audio playback signals in accordance with audio playback data which are provided by the game control portion 11, and issuing them to the speaker 5.

Further, an external storage device 20 is connected to the game control portion 11. As the external storage device 20, a nonvolatile semiconductor memory device such as EEPROM, or a storage medium such as a magnetic storage device which can retain a memory even when power is not supplied, is used. The storage medium of the external storage device 20 may be detachable from the game machine 1.

In the external storage device 20, a game program 21 and game data 22 are recorded. The game program 21 is a computer program necessary for executing a predetermined music game on the game machine 1. When the game machine 1 starts up, the game control portion 11 executes various initial settings necessary for operations of the game machine 1 by executing an operation program stored in the internal storage device, and subsequently, sets environments to execute the music game based on the game program 21 by executing the game program 21 read from the external storage device 20. By the execution of the game program 21, a sequence processing portion 14, an operation evaluation portion 15, an appearance position control portion 16, and a way control portion 17 are generated in the game control portion 11. The sequence processing portion 14, the operation evaluation portion 15, the appearance position control portion 16, and the way control portion 17 are logical devices provided by a combination of computer hardware and a computer program. The sequence processing portion 14 executes processing necessary of the progress of the music game such as indications of the operation to the player P in accordance with the playback of the music piece and generations of the sound effect in accordance with the operation of the player P. The operation evaluation portion 15 executes processing such as evaluations of the operation of the player P and indications for audio outputs in accordance with the evaluation result. The appearance position control portion 16 executes processing to determine an appearance position p of the object O appearing on the game area A, based on the operation of the player P to the touch panel 4. The way control portion 17 executes processing to determine a way W to the determination line Li of the object O drawn on the game area A, based on the appearance position p of the object O determined in the appearance position control portion 16 (see FIG. 3A). Further, in the game control portion 11, various logical devices other than those described above may be generated by the execution of the game program 21.

In the game data 22, various types of data, which are referred to at the time of the execution of the music game based on the game program 21, are included. For example, sequence data 23, lane data 24, and determination line data 25 are included in the game data 22. The sequence data 23 is data which defines an operation or the like to indicate to the player P. At least a piece of the sequence data 23 is prepared for a piece of the music data. Many different types of the sequence data 23 which changes a level of difficulty or the like may be prepared for a music piece. The lane data 24 is data which records a shape including a position within the game area A and an inclined angle of a lane La as a indicator guide portion which guides a movement of the object O appearing in the game area A, and an attribute influencing the guided object O or the like. The determination line data 25 is data which records a setting or the like of an point addition or a point deduction in an evaluation by the position of the determination line Li within the game area A, a moving path when the determination line Li moves and an arrival position at the determination line Li of the object O. In addition, in the game data 22, music data necessary for reproducing a music, which is a subject of a game, from the speaker 5, sound effect data which records many different types of sound effect to be issued from the speaker 5 in response to the operation of the player P in correspondence to unique codes at each sound effect, and image data for displaying a background image on the game screen, various types of objects O, icons, the lane La, the determination line Li, a gauge, or the like on the monitor 3, are included.

Figure 3A:
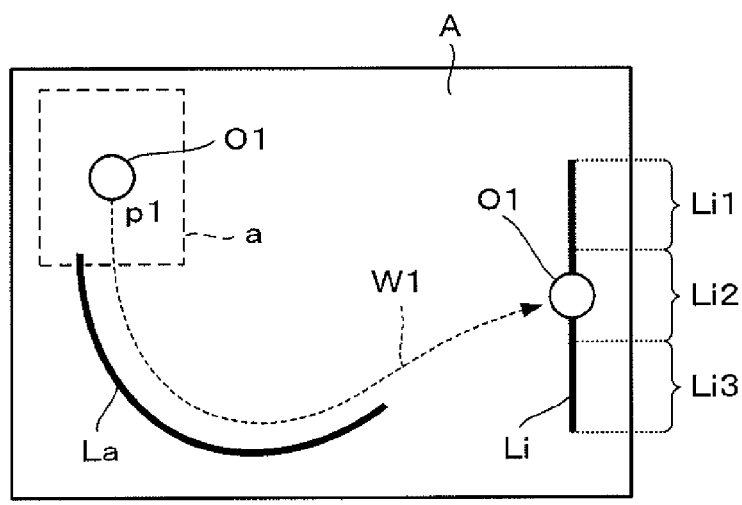
FIG. 3A is a diagram showing an outline of a game area.

Next, an outline of the music game executed in the game machine 1 will be described. FIG. 3A shows an outline of a game area A. Outside the game area A of the game screen on the monitor 3, information necessary for the progress of the game such as score which is not shown in FIG. 3 is displayed. At the time of starting the game, in the game area A, a lane La and a determination line Li are shown. When the player P touches an appearance area a displayed on the touch panel 4 in accordance with operation timings of a music reproduced during the progress of the game, an object O1 (unless otherwise distinguished, the object may be represented by referential mark O) appears at a position p1 (which is also referred to as an appearance position, and unless otherwise distinguished, the position may be represented by referential mark p) touched by the player P. The appearance area a occupies a part of the game area A and is provided at a position adjacent to the lane La. The appearance area a is displayed in the game area A in a shape such that the appearance area a can be recognized by the player P. As one example, the appearance area a may be surrounded by a line, or the appearance area a and other areas may be distinguished by colors.

At a timing when the object O1 needs to appear (within a regulation time), when the player P touches a certain position in the appearance area a, the object O1 appears at the appearance position p1 where the player P touched. The guide of the regulation time to the player P is performed by displaying a gauge (not illustrated) indicating the appearance time of the object O1 in the game screen including the game area A and representing the appearance time by a timing filling the gauge. The object O1 appearing by this appearance operation moves along the lane La, as the object O1 falls down in the game area A, that is, as the object O1 is accelerated downward with a downward acceleration, moves while drawing a way W1 (unless otherwise distinguished, the way may be represented by referential mark W) in accordance with velocity at the time when the object O1 is located at a tip of the lane La, and arrives at the determination line Li. For this reason, the lane La is configured to be inclined like a jump ramp. Since the guide by the lane La is stopped before arrival at the determination line Li, the object O1 is displayed as the object O1 flies toward the lane La.

The operation timing of the player P is evaluated by operating the touch panel 4 by the player P at an operation timing when the object O1 arrives at the determination line Li, that is, by performing a touch operation to the object O1 at this operation timing. The operation of the player P is evaluated based on the difference between the time when the player P touched the touch panel 4 and the time when the object O1 arrives at the determination line Li as the evaluation of the operation timing. As the difference is smaller, the operation of the player P is evaluated more highly. In regard to the appearance timing, the time (regulation time) when the object O1 can appear is determined in advance, and if the player P can operate in the appearance area a within the regulation time, the operation makes the object O1 appear at the appearance position. If there is the operation to the appearance area a out of the regulation time or there is no operation, the evaluation of the operation is a failure determination. Alternatively, in regard to the appearance timing when the player P makes the object O1 appear, the difference may be evaluated in a similar manner.

Figure 3B:
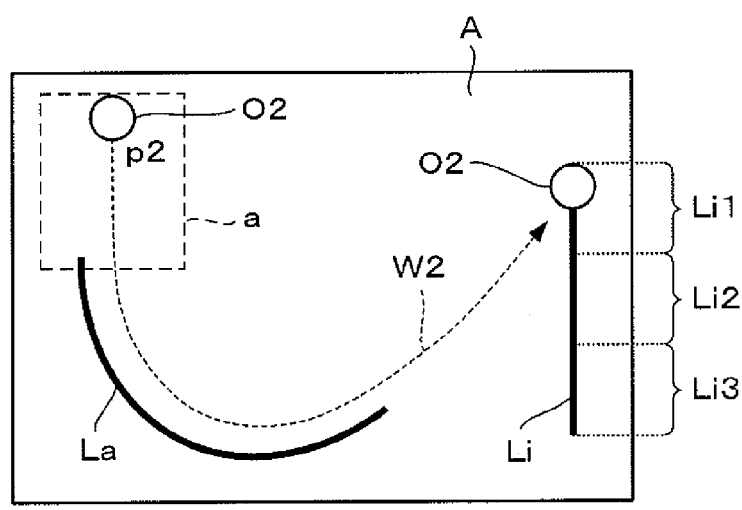
FIG. 3B is a diagram showing an outline of a game area when an operation is different from that in FIG. 3A.
Figure 3C:
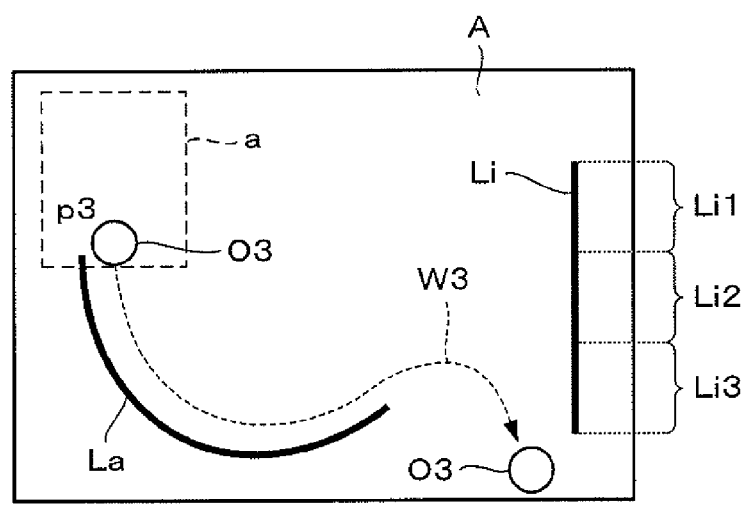
FIG. 3C is a diagram showing an outline of a game area when an operation is different from those in FIGS. 3A and 3B.

The way W of the object O differs depending on the appearance position p where the player P makes the object O appear. FIG. 3A shows a case that the object O appears near the center of the appearance area a, FIG. 3B shows a case that the object O appears in an upper portion of the appearance area a, and FIG. 3C shows a case that the object O appears in a lower portion of the appearance area a. FIG. 3B shows a way W2 in the case that the object O2 appears in the upper portion of the appearance area a. When the object O2 appears at an upper appearance position p2 of the appearance area a by the operation of the player P, the velocity of the moving object O2 is increased by the influence of the acceleration, and therefore, the way W2 is changed. The object O2 arrives at an upper side of the determination line Li than the case of FIG. 3A that the object appears near the center of the appearance area a. Further, in the case of FIG. 3C, the velocity of the object O3 is decreased because an object O3 appears at an appearance position p3 of a lower portion of the appearance area a, and therefore, the object O3 cannot arrive at the determination line Li. The evaluation of this operation is a failure determination. As such, the way W is changed by the appearance position p of the appearance area a, and the position arriving at the determination line Li is changed.

The determination line Li is divided into a plurality of regions Li1, Li2 and Li3. For example, the player P makes the object O appear to aim at the region Li1 by performing a setting such that a higher score is obtained as an object arrives at an upper side of the determination line Li. In order to aim at the region Li1, as described in FIG. 3B, the touch operation at a required operation timing becomes difficult and a difficulty level is increased because the velocity of the object O2 is increased. It is possible to enhance the enjoyability of game by changing the evaluation of the operation of the player P in each region Li1, Li2 and Li3 at which the object O arrives. Further, even when the operation makes the object appear by changing the appearance position p as in FIGS. 3A to 3C, the operation time being timings of arriving at the determination line Li are all equal to one another. The length of the distance is adjusted by the moving velocity of the object O, and the object O arrives at the determination line Li at the same operation time.

Figure 4:
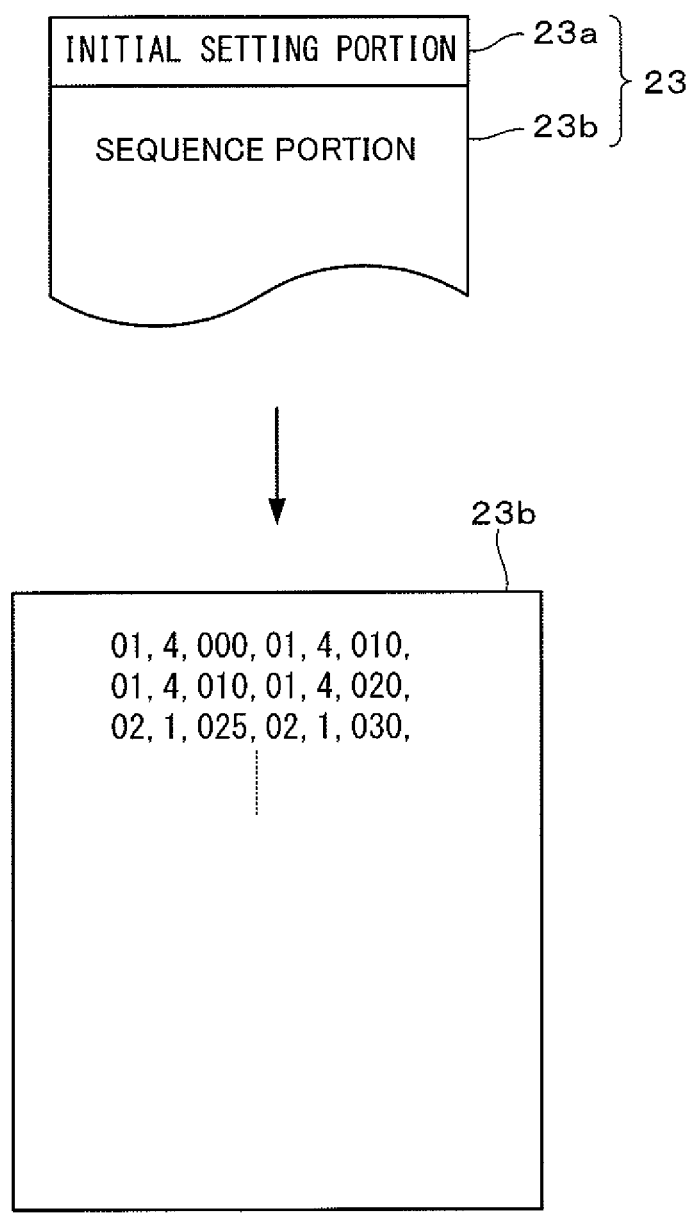
FIG. 4 is a diagram showing one example of a configuration of sequence data.

Next, further details about the sequence data 23 will be described with reference to FIG. 4. As shown in FIG. 4, the sequence data 23 is included in a condition definition portion 23a and a sequence portion 23b. In the condition definition portion 23a, information to specify a execution conditions of the game which differs from one music piece to another such as information to specify the tempo of the music (BPM, for example) and the sound effect when the player P operates the touch panel 4, information to specify the appearance time of the object O and an allowable time (regulation time) of the appearance operation of the object O, and information to specify a correspondence relation between the difference of the above-described operations and the evaluation is described.

In contrast, in the sequence portion 23b, the appearance time of making the object O appear in the game area A during the music and the operation time to touch the appearing object O corresponding to the respective object O are described. As a part of the sequence portion 23b is shown in FIG. 4 for example, the sequence portion 23b is configured as set of plural records where the appearance time and the operation time corresponding to the respective object O are described. In the appearance time and the operation time of the each record, bar number on the music piece, the number of beat and the time in the beat which are delimited by a comma are described respectively. The time in the beat is elapsed time since the top of a beat and expressed as number from the top of the beat to divide time of a beat into n equal parts. For example, if n=100, the second bar first beat and the time when quarter passed from the top of the beat are specified as appearance timing, it is described as "02, 1, 025".

In the case of FIG. 4, the object O1 coinciding with the determination line L1 on the top of the first bar second beat (000) is touch operated (in the sequence portion 23b, it is specified as "line_1"). In the example of FIG. 4, the object O appears at a starting time (000) of the first bar fourth beat, and the object O moves along the way W and coincides with the determination line L at a timing elapsed from the starting time of the first bar fourth beat by "010". In this manner, the appearance time and the operation time are specified. Further, in FIG. 4, the condition definition portion 23a is provided at only the head of the sequence data 23, but a condition setting portion (not shown) including information to specify the tempo of the music, information to specify sound effects to generate when the touch panel 4 is operated or the like as in the condition definition portion 23a, may be included in appropriate location in the middle of the sequence portion 23b. It is possible to execute the processing such as change of the tempo on the music piece and change of assigned sound effect by including such condition setting information in the sequence portion 23b.

Next, processing of the game control portion 11 when the music game is executed in the game machine 1 will be described. The game control portion 11 executes initial settings necessary for the execution of the music game by reading the game program 21 and then stands by for the indications by the player P to start the game. The operation to identify data for use in the game such as selections of the music piece played on the game or the level of difficulty is included in the indication to start the game. Acceptance of these indications may follow the same procedure as the conventional music game and the like.

When the game's beginning is indicated, the game control portion 11 starts to play the music from the speaker 5 by reading the music data corresponding to the music selected by the player P and outputting the music data at the audio output control portion 13. The game control portion 11 displays the game area A on the monitor 3 by issuing the image data necessary for drawings of the game area A to the display control portion 12 with reference to the image data by reading the sequence data 23 corresponding to the selection of the player P in synchronization with the playback of the music piece. During the execution of the music game, the game control portion 11 repeatedly executes a sequence processing routine shown in FIG. 5 at predetermined intervals as the processing necessary for the display of the game area A and the like. The sequence processing portion 14 executes the routine shown in FIG. 5 and a part thereof executes the appearance position control portion 16 and the way control portion 17.

Figure 5:
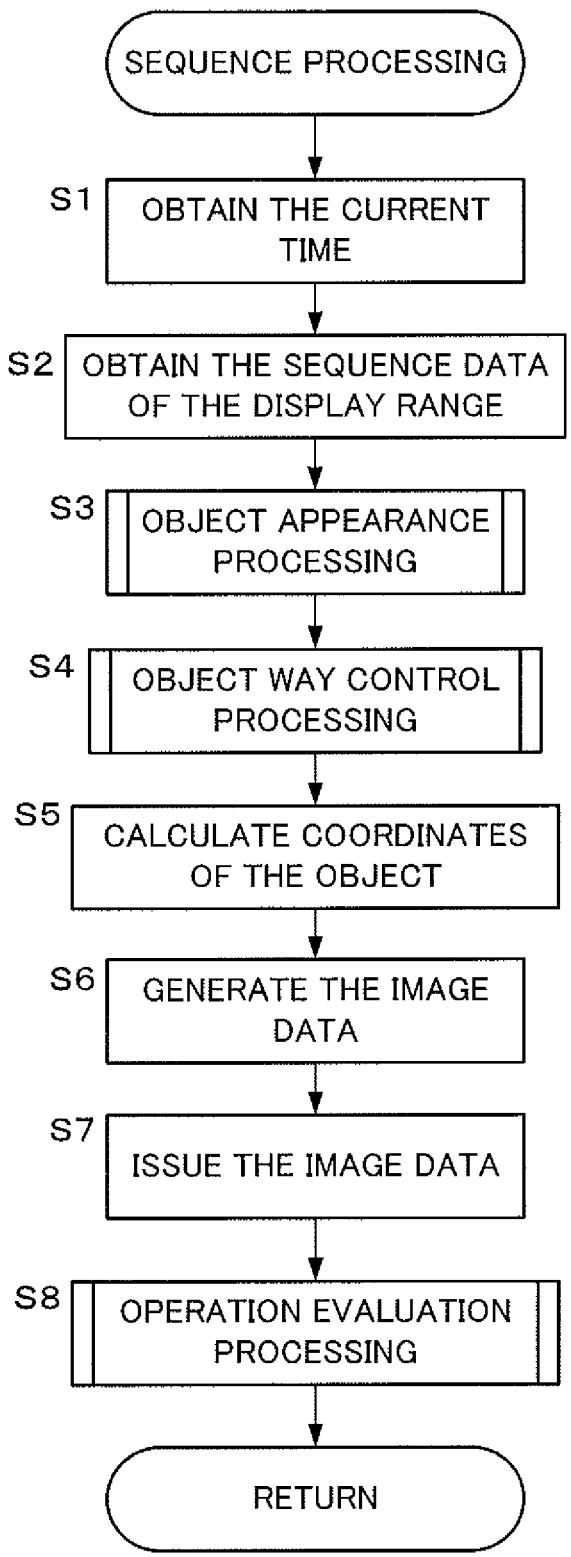
FIG. 5 is a flowchart showing a sequence processing routine to be executed by the game control portion.

When the sequence processing routine shown in FIG. 5 is started, the sequence processing portion 14 of the game control portion 11 obtains a current time on the music piece in the first step S1. For example, timer is started with an internal clock in the game control portion 11 on the basis of the point of playback starting time of the music piece and the current time is obtained from the value of the internal clock. In the next step S2, the sequence processing portion 14 obtains data of the appearance time and the operation time from the sequence data 23 existing in the duration corresponding to a display range of the game area A. As one example of the display range, a time range corresponding to two bars of the music piece from the current time to the future is configured.

In the next step S3, the sequence processing portion 14 makes the appearance position control portion 16 execute the object appearance processing at the appearance time obtained in step S2. The object O appears in the appearance area a by this processing. Details of the object appearance processing will be described later. In the next step S4, the sequence processing portion 14 makes the way control portion 17 execute the object way control processing which controls the way W where the appearing object O moves. A path along which the object O moves in the game area A is determined by this processing. Details of the object way control processing will be described later. In the step S5, the sequence processing portion 14 calculates and obtains coordinates which are necessary for displaying the moving path of the object O in the game area A and appearance coordinates based on the appearance position and the way of the object O determined in the steps S3 and S4. In the next step S6, the sequence processing portion 14 generates image data necessary for drawing the game area A based on the coordinates of the object O calculated in the step S5. Specifically, the image data is generated such that the object O is arranged at the calculated coordinates. The image of the object O may be obtained from the image data of the game data 22. In the next step S7, the sequence processing portion 14 issues the image data to the display control portion 12. In this way, the game area A is displayed on the monitor 3.

In the next step S8, the sequence processing portion 14 makes the operation evaluation portion 15 execute the operation evaluation processing of the operation timings of the player P at the obtained operation time in the step 2. Details of the operation evaluation processing will be described later. The sequence processing portion 14 quits the sequence processing routine after finishing the processing of the step 8. The object O appears based on the operation of the player P to the touch panel 4 and is displayed on the monitor 3 such that the object O moves along the lane La and arrives at the determination line Li by executing the above processing repeatedly. The play of the player P is evaluated by the difference between the operation time described in the sequence data 23 and the operation timing at which the player P operates. Upon this evaluation, which one among the regions Li1 to Li3 of the determination line Li the object O arrives at is considered.

Figure 6:
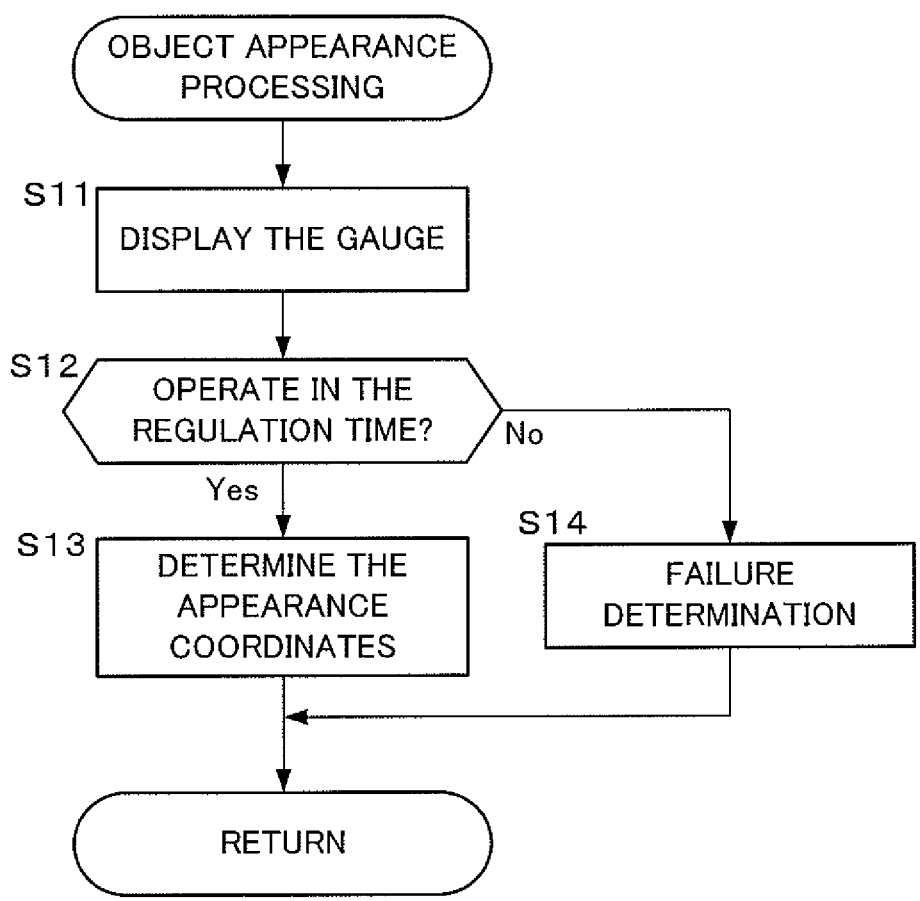
FIG. 6 is a flowchart showing an object appearance processing routine to be executed by the game control portion.

It will be described an object appearance processing routine executed by the appearance position control portion 16 with reference to FIG. 6. When the object appearance processing routine of FIG. 6 is executed, in the step S11, the appearance position control portion 16 first generates the image data necessary for drawing such that a gauge corresponding to the object O is displayed on the game screen according to the appearance time with reference to the data of the appearance time of the object O obtained by the sequence processing portion 14 and the image data of the game data 22 and issues the image data to the display control portion 12. The appearance time and the regulation time of accepting the appearance of the object O may be notified to the player P by the displaying of the gauge. The gauge may be provided close to the appearance area a in the game area A, or may be provided outside the game area A. For example, an hourglass may be displayed as the gauge to notify the appearance time at a timing filling the hourglass and to notify the regulation time by shining or blinking of the hourglass. Further, the appearance time may be counted down. For example, number "3" may be displayed and counted down like "2" and "1".

"Go!" may be displayed at the timing coinciding with the appearance time and "Go!" may be continuously displayed during the regulation time. In regard to the displaying of the gauge, a shape suitable for the theme of the game may be adopted, and an appropriate modification may be made. A line surrounding the appearance area a may have the same function as the gauge.

In the next step S12, the appearance position control portion 16 obtains the regulation time corresponding to the appearance time, and determines whether or not there is an appropriate operation of the player P during the regulation time. The appropriate operation refers to a touch operation of the player P to the touch panel 4 into the appearance area a. The appearance area a may be fixed to the game area A, or may be variable. In the varying case, the appearance area a may move in the game area A, or a high-pitched sound may be located on an upper side and a low-pitched sound may be located on a lower side, depending on a pitch of a sound of a song being reproduced. The data regarding the displaying of the appearance area a may be recorded in the game data 22, and the appearance position control portion 16 may generate image data based on this data, such that the appearance area a is displayed according to the progress of the game, and issue the image data to the display control portion 12.

When the touch operation is performed outside the appearance area a, or when no touch operation is performed, the appearance position control portion 16 proceeds to the step S14 to make an evaluation of failure determination with respect to the object O corresponding to the appearance time, and quits the processing. On the other hand, when the touch operation into the appearance area a is performed, the appearance position control portion 16 proceeds to the step S13 to determine coordinates as appearance coordinates corresponding to the position where the touch operation is performed. The appearance position control portion 16 notifies the determined appearance coordinates to the sequence processing portion 14, and quits the processing. the appearance coordinates at which the object O appears are determined by this processing. When the operation of the player P is failed, the evaluation of failure determination is made with respect to the object O.

Figure 7:
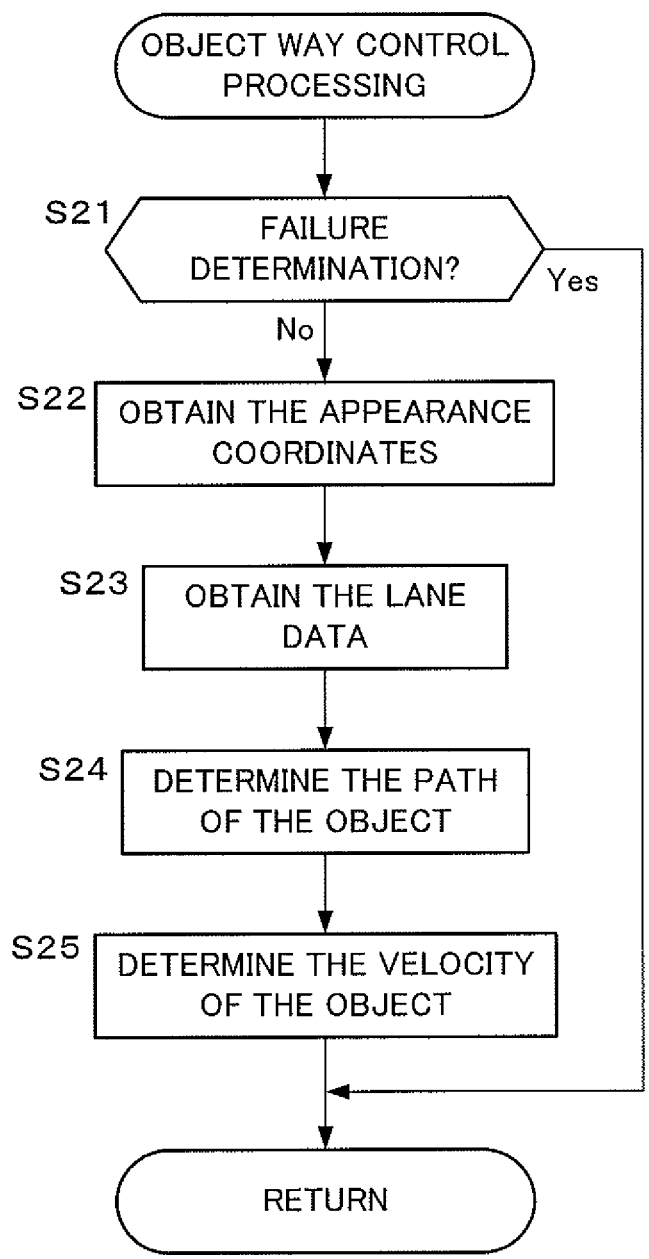
FIG. 7 is a flowchart showing an object way control processing routine to be executed by the game control portion.

It will be described the object way control processing routine executed by the way control portion 17 with reference to FIG. 7. When the object way control processing routine in FIG. 7 is executed, the way control portion 17 determines in the step S21 whether the object O necessary to control the way W is determined as a failure in the object appearance processing routine. When the failure determination is made due to the player P's mistake in the operation and the object O does not appear, it is unnecessary to execute the subsequent processing of determining the way W. Therefore, the way control portion 17 quits the processing.

On the other hand, when the failure determination is not made and the object O appears in the appearance area a, the way control portion 17 proceeds to the step S22 to obtain the appearance coordinates determined in the step S31 of the object appearance processing. In the next step S23, the way control portion 17 obtains the currently selected lane data 24 from the lane data 24 of the game data 22. The lane data 24 may be selected according to the currently selected music piece, or may be selected by a level of difficulty or the player P. As the lane data 24, besides the lane La such as a jump ramp shown in FIG. 3A, a lane La having a different tilt angle, a lane having a modified shape of the lane La, or a lane having an attribution changing the velocity of the object O in the lane La is recorded. As an example that the shape of the lane La is changed, the lane La may repeat a protrusion and a recess by the elapse of time, or the shape of the lane La may be changed according to a frequency or waveform of a selected music. As an example that the lane La has an attribution, the velocity of the object O guided in a specific area of the lane La may be increased or decreased. In order to notify the player P that the lane La has such an attribution, some type of mark may be made at a predetermined position, and the velocity may be changed when the object O passes through the mark. Further, the mark may moves on the lane La. In this way, since it is difficult for the player P to predict the way W of the object O, the game may become more exciting. Further, the entire lane La may move on a predetermined path.

In the next step S24, the way control portion 17 calculates the path of the object O from the lane data 24 obtained in the step S23 and the appearance coordinates obtained in the step S22. The object O moves along the lane La while basically moving downward. Further, the path is determined based on the characteristic of the lane La and the appearance coordinates. In the next step S25, the way control portion 17 calculates the velocity of the object O. In a similar manner to the path determination in the step S24, the velocity of the object O is determined from the appearance coordinates and the selected lane La. The velocity is determined considering the time when the player P makes the object O appear actually in the appearance area a and the operation time of the object O. When the player P makes the object O appear immediately before the end of the regulation time, the velocity is increased by comparison with the object O appearing at the appearance time even at the same appearance position. After the step S25, the way control portion 17 quits the processing. According to the object way control processing, the way W of the object O on the game area A is determined by calculating the moving path and the velocity of the object O.

Figure 8:
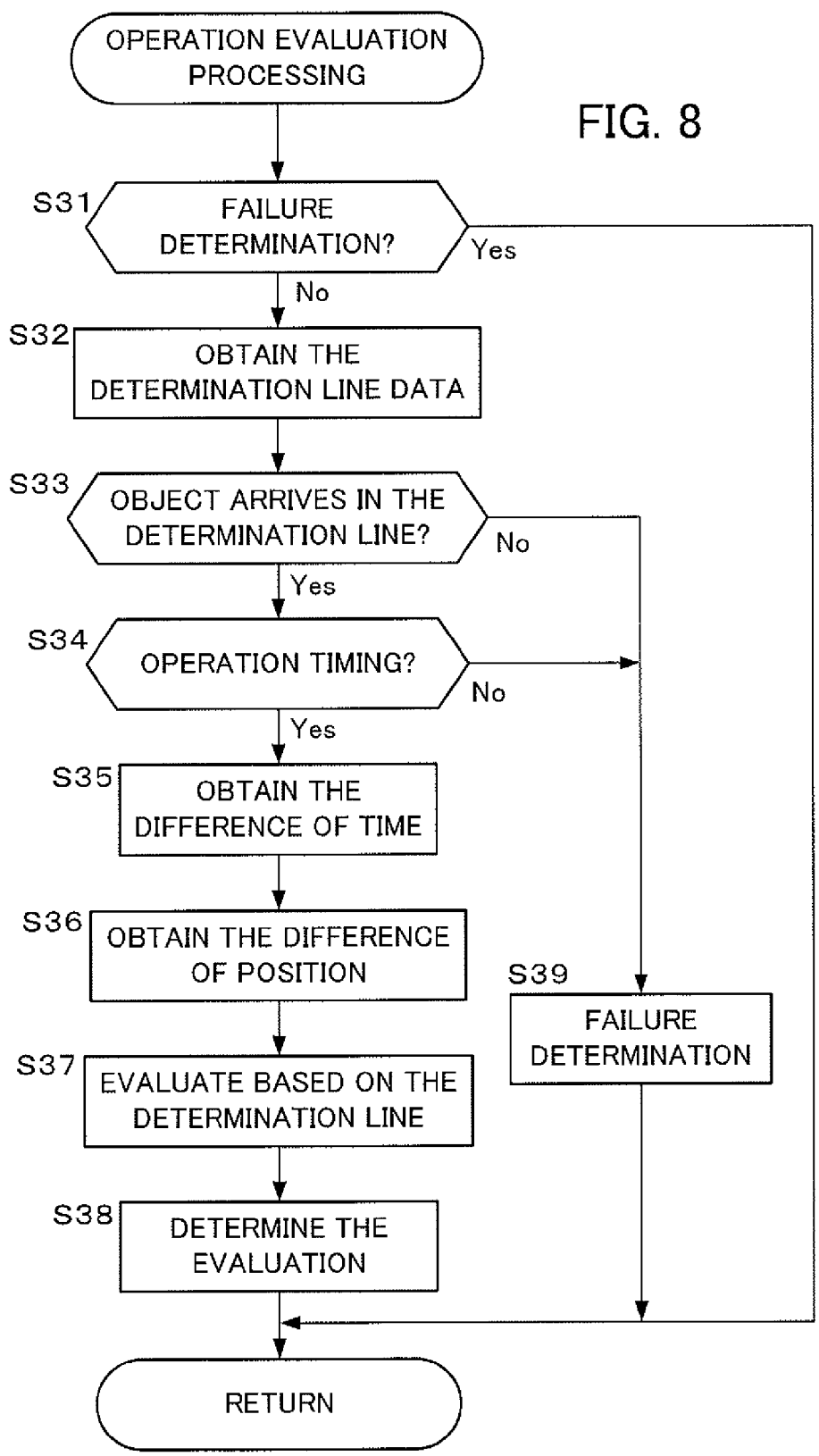
FIG. 8 is a flowchart showing an operation evaluation processing routine to be executed by the game control portion.

It will be described the operation evaluation processing routine executed by the operation evaluation portion 15 with reference to FIG. 8. When the operation evaluation processing routine of FIG. 8 is executed, in the step S31, the operation evaluation portion 15 determines whether the object O to be evaluated in this processing is determined as a failure in the object appearance processing routine. When the failure determination is made due to the player P's mistake in the operation and the object O does not appear, it is unnecessary to execute the subsequent operation evaluation processing. Therefore, the operation evaluation portion 15 quits the processing.

When the object O appears, the operation evaluation portion 15 obtains the determination line data 25 selected in the currently executed game from the determination line data 25 in the game data 22. In the determination line data 25, the determination line Li is divided into a plurality of regions, and different evaluations are set to the respective regions. For example, with respect to the determination line Li having the above-described regions Li1 to Li3 (see FIG. 3A), different evaluations are set to each region, just like point addition evaluation to the region Li1, no evaluation to the region Li2, and point deduction evaluation to the region Li3. Different evaluations may not necessarily be set to all regions, just like no evaluation to the regions Li1 and Li3 and point addition evaluation to the region Li2. Appropriate modifications can be made considering a difficulty level configuration of the game. As the evaluation, there may be the point addition evaluation, the point deduction evaluation, or obtaining a certain item. The evaluation may be set regardless of advantage and disadvantage of the player. In addition to the determination line Li having the above-described regions Li1 to Li3, the determination line Li may always move according to a predetermined movement condition. For example, the determination line Li may reciprocate vertically. In this case, the movement condition is described in the determination line data 25. A case in which the object O arrives at a predetermined region of the moving determination line Li may be highly evaluated. In this case, since the player P can be urged to perform the operation of generating the object O aiming at a predetermined region having a high evaluation while predicting the movement of the determination line Li, it is possible to enhance the enjoyability of game. Even when the determination line Li moves, the movement range of the determination line Li may be determined such that the object O arrives at the determination line Li at the operation time of the object O. The movement range may be determined such that the object O does not arrive at the determination line Li on a certain condition such as low velocity. This movement range is also described in the determination line data 25. Further, the determination line Li may move according to musical intervals of the music piece being reproduced. For example, the determination line Li may be set to move vertically such that a high-pitched sound is located on an upper side and a low-pitched sound is located on a lower side. In accordance with this rule, the movement of the determination line Li may be notified to the player P in advance. In this case, the player P may predict the movement of the determination line Li and generate the object O.

In the next step S33, the operation evaluation portion 15 determines whether or not the target object O arrives at the determination line Li. When the object O arrives at the determination line Li, the operation evaluation portion 15 proceeds to step S34 to determine whether or not the touch panel 4 is operated by the player P at the operation time of the target object O. When the touch operation by the player P in the appearance area a is performed within a predetermined allowable time before and after the operation time, the operation evaluation portion 15 proceeds to the next step S35. On the other hand, when the object O does not arrive at the determination line Li in the step S33, or when there is no touch operation within the predetermined allowable time in the step S34, the operation evaluation portion 15 proceeds to the step S39 to determine the operation to the corresponding object O as a failure, and quits the processing.

In the step S35, the operation evaluation portion 15 obtains a difference between time when the player P touched the touch panel 4 and time when the object O coinciding with the determination line Li. In the next step S36, the operation evaluation portion 15 obtains a difference between coordinates of a position where the player P touched the touch panel 4 and operation coordinates where the object O arrives at the determination line Li. In the next step S37, the operation evaluation portion 15 obtains an evaluation based on the position where the object O arrives at the determination line Li. In the evaluation by the determination line Li, the evaluation of the region including the arrival position where the object O arrives at the determination line Li is made as the evaluation of the operation of the player P by referring to the determination line data 25 obtained in the step S25. When the object O appears, the operation evaluation portion 15 obtains the determination line data 25 selected in the currently executed game from the determination line data 25 in the game data 22. In addition to the determination line Li having the above-described regions Li1 to Li3 (see FIG. 3A), the determination line Li may always move according to a predetermined movement condition.

In the next step S38, the operation evaluation portion 15 determines the evaluation of the target object O. In the above determination, the evaluation by the difference, the misalignment of the operation position, and the arrival position of the determination line Li in these steps S35 to S37 is determined in a comprehensive manner. For example, the evaluation of the operation may be made focusing on the difference, and the evaluation of the arrival position of the determination line Li may be reflected to only the score. The evaluation of the misalignment of the operation position may be considered in an advanced level mode having a high difficulty level, and may not be considered in a beginning level mode. The evaluation of the difference may be made such that the operation time and time before and after the operation time are distinguished in step by step, a segment including the operation time is highly evaluated, and low evaluation is made as being away from the operation time. Like the evaluation of the difference, the evaluation of the misalignment of the operation position may be made such that the region including the center of the object O and peripheral regions thereof are distinguished step by step, the region including the center of the object O is highly evaluated, and low evaluation is made as being away from the center. When the evaluation of the target object O is determined, the operation evaluation portion 15 quits the processing. According to the operation evaluation processing, a failure determination is made with respect to the object O which does not arrive at the determination line Li. On the other hand, the operation of the player P with respect to the object O arriving at the determination line Li may be evaluated considering which region of the determination line Li the object O arrives at.

In the above aspect, the external storage device 20 of the game machine 1 serves as a sequence data storage device, an indicator guide portion data storage device, and an operation reference portion data storage device. Further, the game control portion 11 serves as an appearance position control device by making the appearance position control portion 16 execute the object appearance processing routine of FIG. 6, serves as a way control device by making the way control portion 17 execute the object way control processing routine of FIG. 7, serves as an operation evaluation device by making the operation evaluation portion 15 execute these steps S34 to S36 of the operation evaluation processing routine of FIG. 8, and serves as a position evaluation device by making the operation evaluation portion 15 execute the step S37 of the operation evaluation processing routine of FIG. 8.

The present invention is not limited to the above-described aspect, and can be carried out in various kinds of aspects. For example, in this aspect, the example in which the lane La is provided within the game area A has been described, but the invention is not limited thereto. For example, the lane La may not exist within the game area A. The appearance area a may be divided into a plurality of blocks, and different paths or velocities may be set to each block. Further, a plurality of lanes La may be provided in the game area A. The appearance area a may be divided into a plurality of blocks, and the lane La may be allocated to each block. The appearance area a may be provided to each lane La.

The operation evaluation processing routine of FIG. 8 may be executed while omitting these steps S34 to S36. As such, without evaluating the operation timing of the player P on the determination line Li, the evaluation is made based on the regions Li1, Li2 and Li3 of the determination line Li at which the object O arrives. In this way, a shooting element aiming at a specific region (for example, any one of the regions Li1, Li2 and Li3) as a target may be reinforced. It may be incorporated without uncomfortable feeling by setting the object O as a bullet even when a music game is being played. As such, a game having a strong shooting element which omits the execution of these steps S34 to S36 may be executed in an advanced level mode having a high difficulty level. Alternatively, a game which merely hits the object O to the target region may be executed in a beginning level mode having a low difficulty level. The difficulty level may be adjusted by adjusting the size of the target region or the velocity of the object O.

Though, in this aspect, the game machine 1 is explained as the business use game machine, it is not limited to this. For example, a consumer use game machine, a mobile game machine, a mobile phone with gaming function, a game system using network and the like can be applied. The operating portion receiving the operation of the player P is not limited to the touch panel 4. For example, the operating portion may be a controller with various operation buttons, or the like. In this case, the appearance position may be designated by an arrow key or the like. The appearance area a may be divided into a plurality of blocks, and a button may be allocated to each block. Input device that can accept an audio input operation or an operation by a gaze can be applied.

What is claimed is:

1. A game system comprising:
   a display device which displays a game screen;
   an operating device which accepts an operation of a player;
   a sequence data storage device which stores sequence data in which operation time of the operating device during a game and appearance time when an operation indicator for indicating an operation at the operation time is displayed on a game area are described in correspondence to each other;
   an appearance position control device which accepts a determination operation of an appearance position which determines the appearance position of the operation indicator in correspondence to the appearance time from the operating device in an appearance area which occupies a part of the game area displayed on the display device and controls so as to generate the operation indicator at the appearance position; and
   a way control device which controls so as to change a way until the operation indicator arrives in an operation reference portion at the operation time based on the appearance position determined by the appearance position control device; wherein
   the way control device changes an arrival position where the operation indicator arrives in the operation reference portion in accordance with the change of the way.

2. The game system of claim 1, wherein
   the appearance position control device generates the operation indicator when the determination operation of the appearance position is performed in a regulation time when the determination operation of the appearance position can be accepted in correspondence to the appearance time.

3. The game system of claim 1, wherein
   the appearance position control device controls such that the appearance area is movable in the game area based on a predetermined rule.

4. The game system of claim 1, wherein
   the game area includes in an indicator guide portion which guides the movement of the operation indicator and the way control device controls so as to change the way of the operation indicator which appears at the appearance position in accordance with a characteristic of the indicator guide portion.

5. The game system of claim 4, comprising
   an indicator guide portion data storage device which stores a plurality of indicator guide portion data in which the characteristic of the indicator guide portion is described, wherein
   the way control device changes the way of the operation indicator based on the indicator guide portion data selected from the indicator guide portion data storage device.

6. The game system of claim 4, wherein
   information for specifying a path of the guided operation indicator is set as the characteristic of the indicator guide portion.

7. The game system of claim 4, wherein
   information for specifying a velocity of the guided operation indicator is set as the characteristic of the indicator guide portion.

8. The game system of claim 1, comprising
   a position evaluation device which makes an evaluation based on an arrival position where the operation indicator arrives in the operation reference portion.

9. The game system of claim 8, comprising
   an operation reference portion data storage device which stores operation reference portion data in which different evaluations of each region where the operation reference portion is divided are described, wherein
   the position evaluation device evaluates a region including the arrival position based on the operation reference portion data as the evaluation of the operation of the player.

10. The game system of claim 9, wherein
    a moving path where the operation reference portion moves in the game area is set in the operation reference portion data.

11. The game system of claim 1, comprising
    an operation evaluation device which accepts the operation from the operating device at the operation timing when the operation indicator appearing at the appearance position moves and arrives in the operation reference portion at the operation time and evaluates a difference between the operation time and the operation from the operating device.

12. A non-transitory storage medium storing a computer program for a game system comprising:
    a display device which displays a game screen;
    an operating device which accepts an operation of a player; and
    a sequence data storage device which stores sequence data in which operation time of the operating device during a game and appearance time when an operation indicator for indicating an operation at the operation time is displayed on a game area are described in correspondence to each other; wherein
    the computer program causes the game system to serve as:
    an appearance position control device which accepts a determination operation of an appearance position which determines the appearance position of the operation indicator in correspondence to the appearance time from the operating device in an appearance area which occupies a part of the game area displayed on the display device and controls so as to generate the operation indicator at the appearance position; and
    a way control device which controls so as to change a way until the operation indicator arrives in an operation reference portion at the operation time based on the appearance position determined by the appearance position control device; wherein
    the way control device changes an arrival position where the operation indicator arrives in the operation reference portion in accordance with the change of the way.

13. A method of controlling a game system comprising:
    a display device which displays a game screen;

an operating device which accepts an operation of a player; and a sequence data storage device which stores sequence data in which operation time of the operating device during a game and appearance time when an operation indicator for indicating an operation at the operation time is displayed on a game area are described in correspondence to each other; wherein the method causes the game system to execute:

an appearance position control step which accepts a determination operation of an appearance position which determines the appearance position of the operation indicator in correspondence to the appearance time from the operating device in an appearance area which occupies a part of the game area displayed on the display device and controls so as to generate the operation indicator at the appearance position; and a way control step which controls so as to change a way until the operation indicator arrives in an operation reference portion at the operation time based on the appearance position determined by the appearance position control device; wherein the way control step changes an arrival position where the operation indicator arrives in the operation reference portion in accordance with the change of the way.

* * * * *